United States Patent [19]

Tricoles

[11] 4,310,852
[45] Jan. 12, 1982

[54] REAL-TIME ELECTROMAGNETIC RADIATION INTENSITY DISTRIBUTION IMAGING SYSTEM

[75] Inventor: Gus P. Tricoles, San Diego, Calif.

[73] Assignee: General Dynamics Corp., Electronics Division, San Diego, Calif.

[21] Appl. No.: 138,325

[22] Filed: Apr. 8, 1980

[51] Int. Cl.$^3$ .............................................. H04N 5/30
[52] U.S. Cl. ................................................... 358/110
[58] Field of Search ............... 358/110, 112, 240, 231; 343/18 E, 6.8 R; 307/311; 455/600, 601, 606, 226, 272, 275, 7, 9, 18, 20, 22; 324/77 A, 95

[56] References Cited

U.S. PATENT DOCUMENTS

| | | | |
|---|---|---|---|
| 2,909,668 | 10/1959 | Thurlby et al. | 358/240 |
| 3,384,893 | 5/1968 | Prestwood | 343/6.8 R |
| 3,524,016 | 8/1970 | Jacobs et al. | 358/110 |
| 3,571,493 | 3/1971 | Baker | 358/231 |
| 3,693,084 | 9/1972 | Augustine | 324/95 |
| 3,911,433 | 10/1975 | Redman | 343/6.8 R |
| 4,068,237 | 1/1978 | Jones, Jr. | 343/18 E |

Primary Examiner—Joseph A. Orsino, Jr.
Attorney, Agent, or Firm—Brown & Martin

[57] ABSTRACT

A real time electromagnetic radiation intensity distribution imaging system. The system includes an array of sensors, such as receiving antennas, for collecting electromagnetic radiation within a given frequency range, each of which is operable for producing a received signal in response to the collected radiation; an array of transmitting antennas geometrically corresponding at a reduced scale to the array of sensors for transmitting electromagnetic radiation within the millimeter wave range; and a branching network having a plurality of channels that individually connect the sensors to the antennas having corresponding positions in the respective arrays. The branching network includes a device for producing a reference signal that is temporally coherent with the received signals; a mixer in each channel for mixing each received signal with the reference signal to provide a coherent intensity signal in each channel; an oscillator for producing a millimeter wave signal; and a modulator in each channel for modulating the millimeter wave signal with the intensity signal produced in such channel to provide intensity modulated millimeter wave signals for transmission from the transmitting antennas. The system further includes a lens for forming an image of the intensity distribution among the modulated millimeter wave signals transmitted from the array of transmitting antennas; and a device for sensing and displaying the intensity distribution image formed by the lens. In an alternative system, coherent visible light waves produced by lasers are intensity modulated instead of millimeter waves when it is desired to provide an image of the intensity distribution of millimeter wave electromagnetic radiation.

12 Claims, 6 Drawing Figures

REAL-TIME ELECTROMAGNETIC RADIATION INTENSITY DISTRIBUTION IMAGING SYSTEM

BACKGROUND OF THE INVENTION

The present invention generally pertains to electronic communications systems and is particularly directed to an improved electromagnetic radiation intensity distribution imaging system. The term electromagnetic radiation as used herein means radiation within the electromagnetic spectrum range that extends between and includes sound waves and light waves.

It is often desirable to provide a visual image of the distribution and intensity of a number of different sources of electromagnetic radiation. For example, on a battlefield there are a number of radio transmitters in the hands of ground troops at various positions over the battlefield. It is desirable to have a real time visual display showing the actual location of these radio transmitters as opposed to their presumed or estimated location. Also on a battlefield there may be a number of tanks that can be located by their emanations of sound waves. It is also desirable to have a real time visual display of the tank's actual positions.

SUMMARY OF THE INVENTION

The present invention is a real time electromagnetic radiation intensity distribution imaging system for indicating the relative locations of sources of electromagnetic radiation within a given frequency range.

The system of the present invention includes an array of sensors, such as receiving antennas, for collecting electromagnetic radiation within a given frequency range, each of which is operable for producing a received signal in response to the collected radiation; an array of transmitting antennas geometrically corresponding at a reduced scale to the array of sensors for transmitting electromagnetic radiation within the millimeter wave range; and a branching network having a plurality of channels that individually connect the sensors to the antennas having corresponding positions in the respective arrays. The branching network includes a device for producing a reference signal that is temporally coherent with the received signals; a mixer in each channel for mixing each received signal with the reference signal to provide a coherent intensity signal in each channel; an oscillator for producing a millimeter wave signal; and a modulator in each channel for modulating the millimeter wave signal with the intensity signal produced in such channel to provide intensity modulated millimeter wave signals for transmission from the transmitting antennas. The system further includes a lens for forming an image of the intensity distribution among the modulated millimeter wave signals transmitted from the array of transmitting antennas; and a device for sensing and displaying the intensity distribution image formed by the lens.

The system of the present invention provides a real time image of sensed electromagnetic radiation sources that radiate only briefly and which frequently would be missed by a scanning antenna.

By transmitting intensity modulated millimeter waves, the system of the present invention is able to accomplish a significant scale reduction from the scale of the array of sensors and thereby provides a compact visual display of the intensity distribution. Millimeter waves permit tolerances on lenses that are much looser than lens tolerances for visible light.

By focusing transmitted millimeter waves that are intensity modulated by coherent intensity signals produced from the electromagnetic radiation collected by the sensor array, the relative distances of the sources of electromagnetic radiation from the sensor array is indicated by the relative clarity of focus of the intensity images in the visual display.

The system of the present invention is useful for locating the direction and relative positions of sources of radio, radar, sound or light waves.

In a separate aspect of the present invention coherent visible light waves are modulated instead of millimeter waves when it is desired to provide an image of the intensity distribution of millimeter wave electromagnetic radiation. In such aspect of the present invention the scale reduction would be sufficiently practical to permit the use of visible light waves in forming the intensity distribution image.

Various structural features of the present invention are described in the description of the preferred embodiments.

DESCRIPTION OF THE PREFERRED EMBODIMENTS

Figure 1:
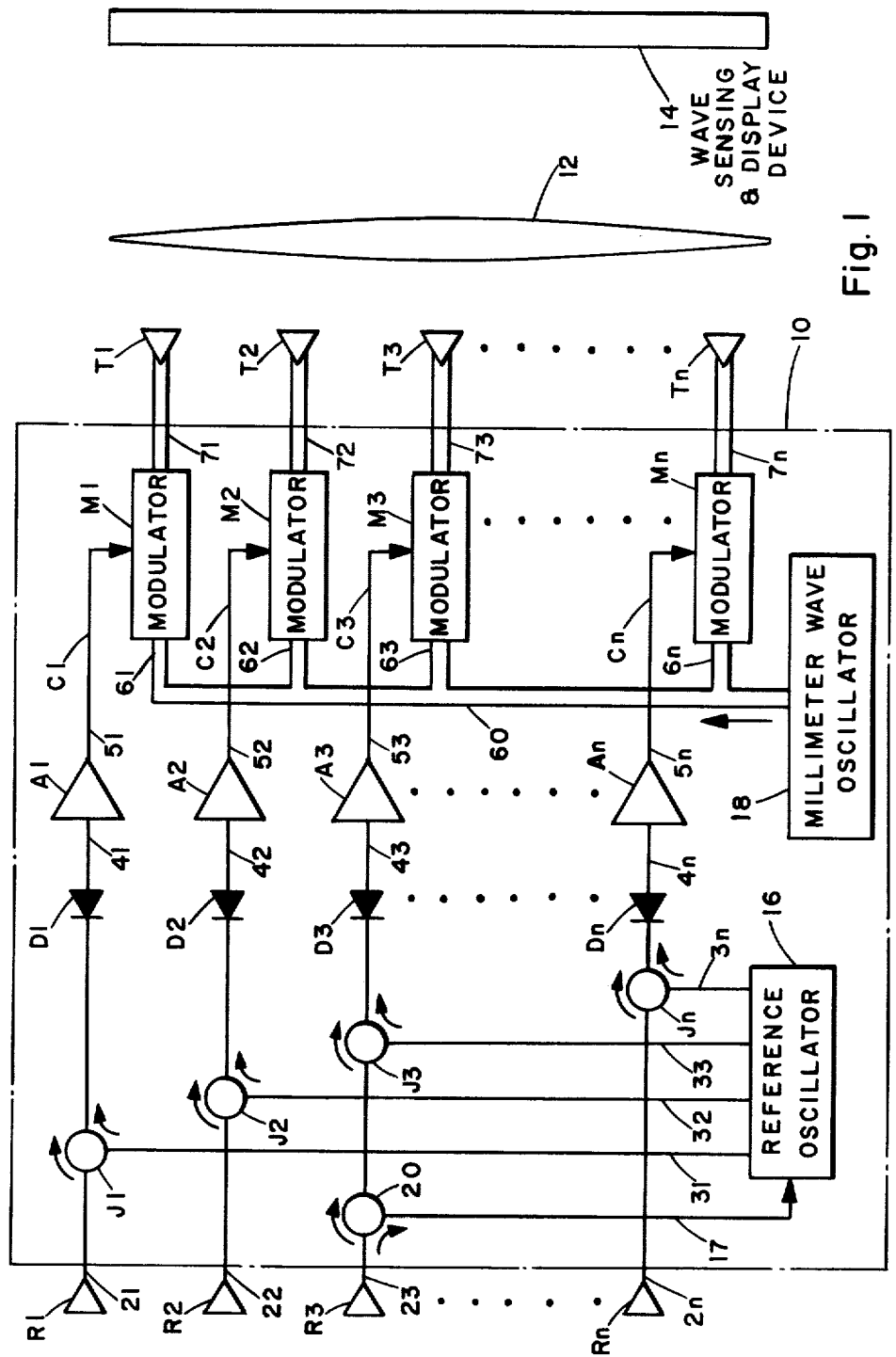
FIG. 1 is a schematic diagram of a preferred embodiment of the system of the present invention.

Referring to FIG. 1, one preferred embodiment of the system of the present invention includes an array of receiving antennas R1, R2, R3, . . . Rn; an array of transmitting antennas T1, T2, T2, . . . Tn; a branching network 10; a lens 12 and a wave sensing and display device 14.

The receiving antennas R1, R2, R3, . . . Rn are designed for collecting electromagnetic radiation within a given frequency range, and each is operable for producing a received signal on lines 21, 22, 23 and 2n respectively in response to the collected radiation.

The branching network 10 includes a plurality of channels C1, C2, C3, . . . Cn; a reference oscillator 16, and a millimeter wave oscillator 18. Each channel C1, C2, C3, . . . Cn respectively contains a diode rectifier D1, D2, D3, . . . Dn; an amplifier A1, A2, A3, . . . An; and a modulator M1, M2, M3, . . . Mn. The branching network 10 further includes a plurality of hybrid junctions J1, J2, J3, . . . Jn and 20. The directions of signal flow through the hybrid junctions are indicated by the arrows positioned adjacent thereto.

The reference oscillator 16 is locked to the phase and frequency of the received signal on line 23 from the receiving antenna R3. The received signal on line 23 is provided to the reference oscillator 16 via the hybrid junction 20 and line 17. The reference oscillator responds to the received signal on line 23 by providing a reference signal on lines 31, 32, 33, . . . 3n that is temporally coherent with the received signals on lines 21, 22, 23, . . . 2n. The reference signal on lines 31, 32, 33, . . . 3n is a better shaped signal in comparison to the received signal on line 23, and thereby better defines the phase of the coherent intensity signals that are produced upon mixing the reference signal with the respective received signals on lines 21, 22, 23, . . . 2n.

The received signals on lines 21, 22, 23, . . . 2n and the coherent reference signal on lines 31, 32, 33, . . . 3n are respectively passed through the hybrid junctions J1, J2, J3, . . . Jn to the diodes D1, D2, D3, . . . Dn. These diodes respectively mix and rectify the received signals and the coherent reference signal to provide coherent intensity signals on lines 41, 42, 43, . . . 4n in each channel C1, C2, C3, . . . Cn.

The coherent intensity signals on lines 41, 42, 43, . . . 4n are amplified by the amplifiers A1, A2, A3, . . . An and further provided on lines 51, 52, 53, . . . 5n to the modulating signal inputs of the modulators M1, M2, M3, . . . Mn.

The millimeter wave oscillator 18 provides a millimeter wave signal in the waveguide 60. The waveguide 60 branches through waveguide sections 61, 62, 63, . . . 6n to the modulators M1, M2, M3, . . . Mn of the channels C1, C2, C3, . . . Cn. These modulators include PIN diodes (not shown) positioned in the waveguide sections 61, 62, 63, . . . 6n and respectively connected to the lines 51, 52, 53, . . . 5n for modulating the millimeter wave signal from the millimeter wave oscillator 18 to provide intensity modulated millimeter wave signals in the respective waveguide sections 71, 72, 73, . . . 7n.

Figure 2:
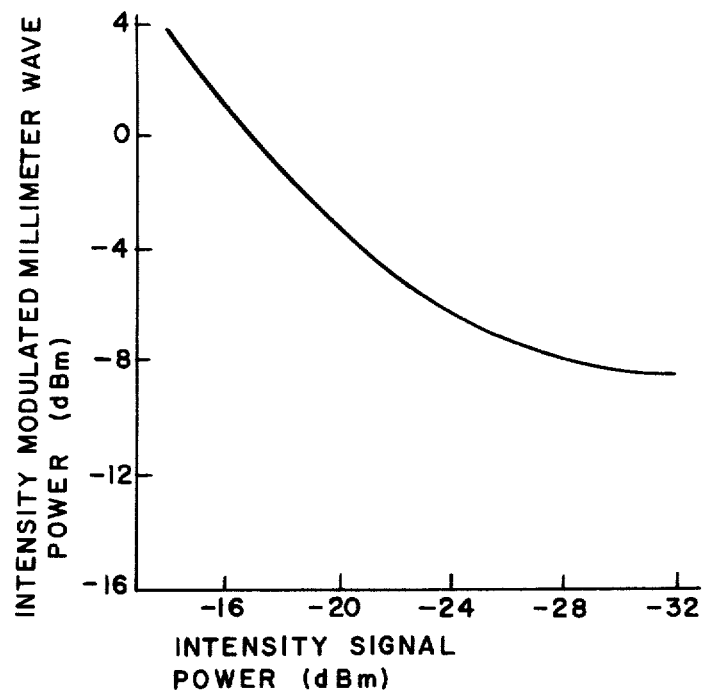
FIG. 2 is a characteristic curve showing the relationship between the power of the intensity signals and the power of the intensity modulated millimeter wave signals in the embodiment of FIG. 1.

The relationship between the power of the intensity signals on lines 51, 52, 53, . . . 5n and the power of the intensity modulated millimeter wave signals in the waveguide sections 71, 72, 73, . . . 7n is shown in FIG. 2. It is seen that this relationship is approximately linear over a range of at least 10 db.

The intensity modulated millimeter wave signals in the waveguide sections 71, 72, 73, . . . 7n are provided to the transmitting antennas T1, T2, T3, . . . Tn for transmission therefrom. The array of transmitting antennas T1, T2, T3, . . . Tn geometrically corresponds at a reduced scale to the array of receiving antennas R1, R2, R3, . . . Rn and are designed for transmitting electromagnetic radiation in the millimeter wave range. The transmitting antennas T1, T2, T3, . . . Tn are disposed for transmitting electromagnetic radiation in a common direction toward the lens 12.

The lens 12 forms an image of the intensity distribution among the modulated millimeter wave signals transmitted from the array of transmitting antennas T1, T2, T3, . . . Tn. The lens 12 is made of a dielectric material.

Figure 3:
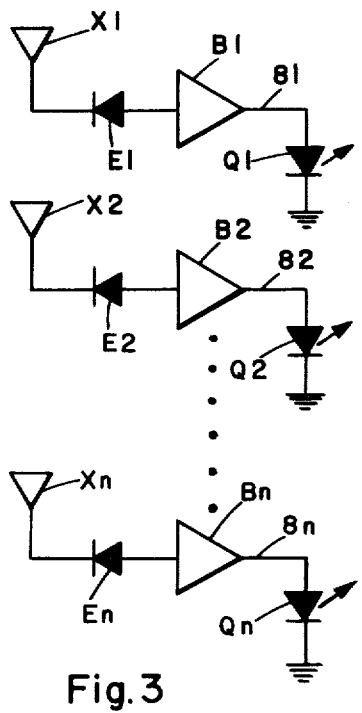
FIG. 3 is a schematic diagram illustrating one preferred embodiment of the wave sensing and display device in the system of FIG. 1.
Figure 4:
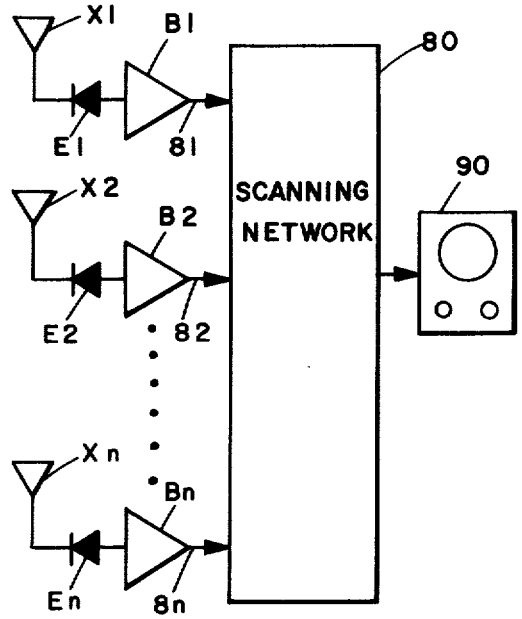
FIG. 4 is a schematic diagram illustrating an alternative preferred embodiment of the wave sensing and display device in the system of FIG. 1.

The wave sensing and display device 14 senses and displays the intensity distribution image formed by the lens 12. Alternative preferred embodiments of the wave sensing and display device 14 are shown in FIGS. 3 and 4. Both embodiments include a tightly packed array of crystal detectors X1, X2, . . . Xn for sensing the focused transmitted millimeter wave signals from the lens 16. These crystal detectors are much greater in number than the number of transmitting antennas T1, T2, T3, . . . Tn in the array of transmitting antennas. The crystal detectors X1, X2, . . . Xn are respectively connected to diode rectifiers E1, E2, . . . En which are in turn connected to amplifiers B1, B2, . . . Bn to provide sensed signals on lines 81, 82, . . . 8n.

In the embodiment of FIG. 3, the sensed signals on lines 81, 82, . . . 8n are provided to light emitting diodes (LED's) Q1, Q2, . . . Qn for controlling the intensity of the light emitted therefrom, and thereby causing these LED's to provide a visual display of the intensity distribution image sensed by the crystal detector array X1, X2, . . . Xn.

In the embodiment of FIG. 4, the sensed signals on lines 81, 82, . . . 8n are provided to a scanning network 80 which is connected to an oscilloscope 90. The oscilloscope 90 scans the signals in the scanning network 80 and provides a visual display of the intensity distribution image sensed by the crystal detector array X1, X2, . . . Xn.

Figure 5:
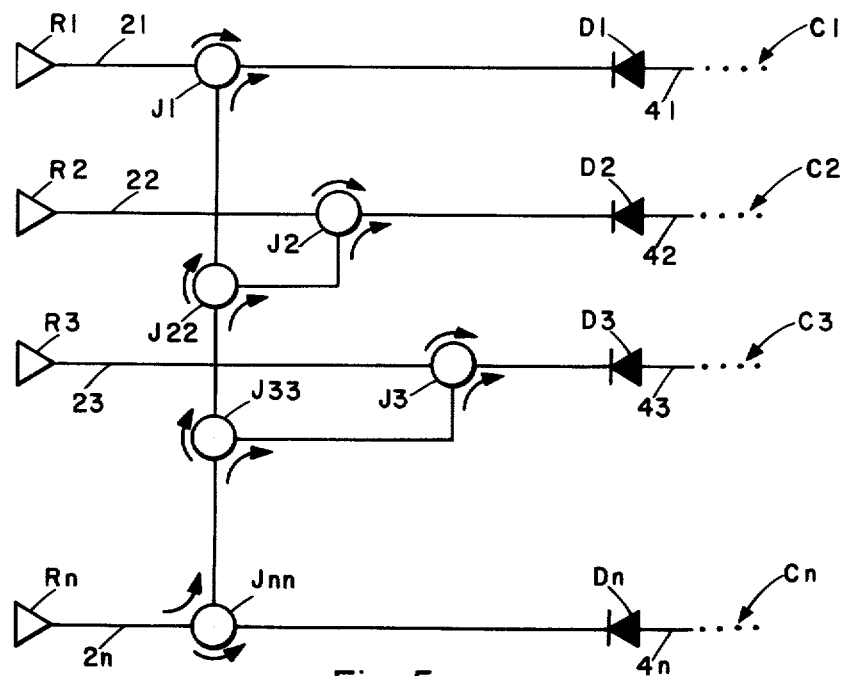
FIG. 5 is a schematic diagram of an alternative preferred embodiment of that portion of the system of FIG. 1 in which the coherent reference signal is produced.

An alternative preferred embodiment of that portion of the system for producing the coherent reference signal is illustrated in FIG. 5. In this embodiment the reference oscillator for producing the reference signal is one of the receiving antennas Rn. This embodiment further includes hybrid junctions J22, J23 . . . Jnn in addition to the hybrid junctions J1, J2, J3, . . . , which perform the same functions as the like-numbered hybrid junctions included in the embodiment of FIG. 1. The remaining components of the channels C1, C2, C3, . . . Cn are the same as in the embodiment of FIG. 1. In the FIG. 5 embodiment, the coherent reference signal is the received signal on line 2n that is produced in response to the collection of electromagnetic energy by the receiving antenna Rn. The reference signal on line 2n is provided to the rectifier diode D1 via hybrid junctions Jnn, . . . J33, J22 and J2; and provided to the rectifier diode D3 via hybrid junctions Jnn, . . . , J33 and J3. In channel Cn, the received signal and the reference signal are one and the same, and such signal is provided to the rectifier diode Dn via the hybrid junction Jnn.

Figure 6:
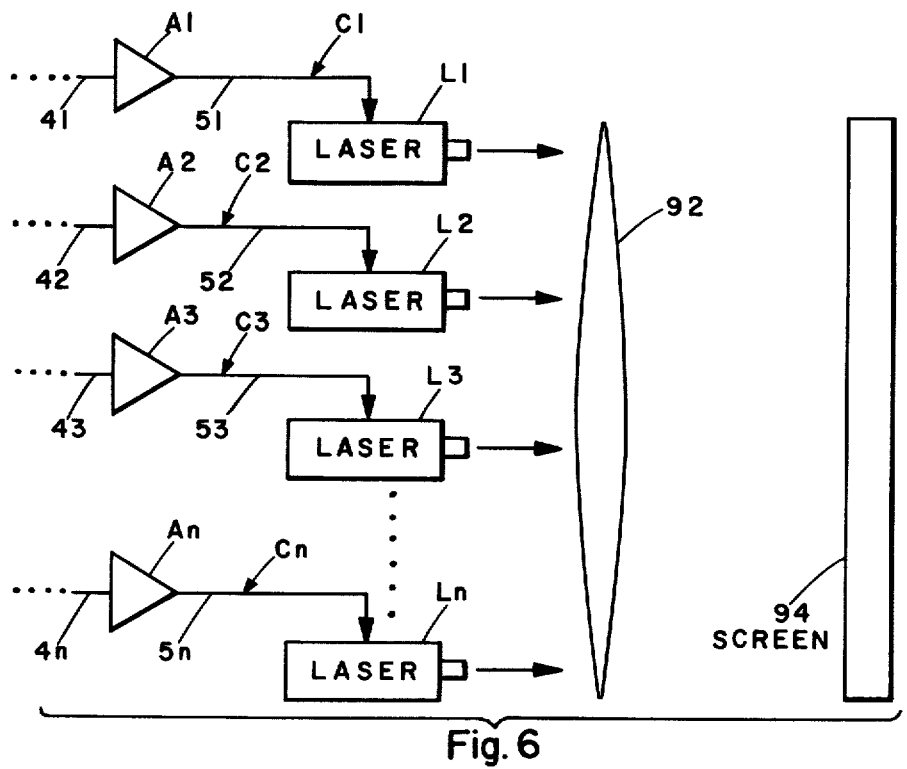
FIG. 6 is a schematic diagram of a portion of a preferred embodiment of that aspect of the present invention in which coherent visible light waves are modulated instead of millimeter waves.

That aspect of the present invention wherein coherent visible light waves are modulated instead of millimeter waves to produce intensity modulated waves is illustrated in FIG. 6. FIG. 6 shows that portion of such embodiment that is different from the embodiment shown in FIG. 1. The portions of the system not shown in FIG. 6 are the same as those portions of the system shown in FIGS. 1 or 5. In the system of FIG. 6 coherent intensity signals are provided on lines 51, 52, 53, . . . 5n in the channels C1, C2, C3, . . . , Cn in the same manner as in the systems of FIGS. 1 or 5. In this aspect of the present invention the receiving antennas R1, R2, R3, . . . Rn (FIGS. 1 and 5) are designed for collecting millimeter wave radiation.

Referring to FIG. 6, each channel C1, C2, C3, . . . Cn is connected to a laser L1, L2, L3, . . . Ln in an array of lasers that geometrically corresponds at a reduced scale to the array of receiving antennas R1, R2, R3, . . . Rn. The lasers L1, L2, L3, . . . Ln radiate coherent visible light along parallel paths. The lasers L1, L2, L3, . . . Ln are intensity modulated by the intensity signals on lines 51, 52, 53, . . . 5n to provide intensity modulated coherent visible light signals that are projected toward a lens 92.

The lens 92 forms an image of the intensity distribution among the modulated coherent visible light signals transmitted from the array of lasers L1, L2, L3, ... Ln. The lens 92 is made of glass.

A screen 94 is provided for displaying the intensity distribution image formed by the lens 92. The screen 94 may be either a wall screen or a rear projection screen.

Having described my invention, I now claim:

1. A real time electromagnetic radiation intensity distribution imaging system, comprising:
an array of sensors for collecting electromagnetic radiation within a given frequency range, each of which is operable for producing a received signal in response to said collected radiation;
an array of transmitting antennas geometrically corresponding at a reduced scale to the array of sensors for transmitting electromagnetic radiation within the millimeter wave range;
a branching network having a plurality of channels that individually connect the sensors to the transmitting antennas having corresponding positions in the respective arrays, said network comprising:
   means for producing a reference signal that is temporally coherent with the received signals;
   means in each channel for mixing each received signal with the reference signal to provide a coherent intensity signal in each channel;
   means for producing a millimeter wave signal; and
   means in each channel for modulating the millimeter wave signal with the intensity signal produced in such channel to provide intensity modulated millimeter wave signals for transmission from the transmitting antennas;
a lens for forming an image of the intensity distribution among the modulated millimeter wave signals transmitted from the array of transmitting antennas; and
means for sensing and displaying the intensity distribution image formed by the lens.

2. A system according to claim 1, wherein each mixing means is a diode rectifier for rectifying and mixing the reference signal and the received signal.

3. A system according to claim 1, wherein the branching network comprises a plurality of millimeter wave waveguides forming the portion of each channel connected to the transmitting antennas and connecting the means for producing the millimeter wave signal to each of the transmitting antennas.

4. A system according to claim 3, wherein each modulating means comprises a PIN diode coupled to the mixing means in such channel and positioned in the waveguide for such channel.

5. A system according to claim 1, wherein the imaging means is a lens made of dielectric material.

6. A system according to claim 1, wherein the means for providing the reference signal is a said sensor for collecting electromagnetic radiation within the given frequency range that is operable for producing the reference signal in response to the radiation collected by such sensor.

7. A system according to claim 1, wherein the means for providing the reference signal is an oscillator that is locked to the phase and frequency of a said received signal produced by a said sensor.

8. A system according to claim 1, wherein the means for sensing and displaying the intensity distribution image comprises:
   an array of crystal detectors for sensing the transmitted millimeter wave signals; and
   means connected to the crystal array for providing a visual display of the intensity distribution image sensed by the crystal detector array.

9. A system according to claim 8, wherein the visual display means comprise light emitting diodes.

10. A system according to claim 8, wherein the visual display means comprises an oscilloscope.

11. A real time electromagnetic radiation intensity distribution imaging system, comprising:
an array of receiving antennas for collecting millimeter wave radiation, each of which is operable for producing a received signal in response to said collected radiation;
an array of lasers geometrically corresponding at a reduced scale to the array of receiving antennas for radiating coherent visible light along parallel paths;
a branching network having a plurality of channels that individually connect the receiving antennas to the lasers having corresponding positions in the respective arrays, said network comprising:
   means for producing a reference signal that is temporally coherent with the received signals;
   means in each channel for mixing each received signal with the reference signal to provide a coherent intensity signal in each channel; and
   means in each channel for modulating the coherent visible light signal produced by the corresponding laser with the intensity signal produced in such channel to provide intensity modulated coherent visible light signals from the lasers; and
a lens for forming an image of the intensity distribution among the modulated coherent visible light signals transmitted from the array of lasers.

12. A system according to claim 11, further comprising:
   means for displaying the intensity distribution image formed by the lens.

* * * * *